(12) United States Patent
den Otter et al.

(10) Patent No.: US 8,706,403 B2
(45) Date of Patent: Apr. 22, 2014

(54) SYSTEMS AND METHODS FOR DETECTING BIFURCATIONS

(75) Inventors: Matthijs Willem den Otter, Veldhoven (NL); Alexandru Serbanescu, Amstelveen (NL)

(73) Assignee: TomTom International B.V., Amsterdam (NL)

( * ) Notice: Subject to any disclaimer, the term of this patent is extended or adjusted under 35 U.S.C. 154(b) by 0 days.

(21) Appl. No.: 13/394,578

(22) PCT Filed: Sep. 6, 2010

(86) PCT No.: PCT/IB2010/002406
§ 371 (c)(1),
(2), (4) Date: May 21, 2012

(87) PCT Pub. No.: WO2011/027224
PCT Pub. Date: Mar. 10, 2011

(65) Prior Publication Data
US 2012/0226436 A1 Sep. 6, 2012

Related U.S. Application Data

(60) Provisional application No. 61/240,253, filed on Sep. 7, 2009.

(51) Int. Cl.
*G01C 21/00* (2006.01)
(52) U.S. Cl.
USPC .......................... 701/411; 701/400; 701/408

(58) Field of Classification Search
USPC ......................................... 701/400, 408, 411
See application file for complete search history.

(56) References Cited

U.S. PATENT DOCUMENTS

| 2003/0093221 | A1* | 5/2003 | Adachi | 701/208 |
|---|---|---|---|---|
| 2004/0206570 | A1* | 10/2004 | Tajima et al. | 180/402 |
| 2008/0189040 | A1* | 8/2008 | Nasu et al. | 701/301 |
| 2010/0094537 | A1* | 4/2010 | Goto et al. | 701/201 |
| 2010/0268460 | A1* | 10/2010 | Wan et al. | 701/210 |

FOREIGN PATENT DOCUMENTS

WO 2008072293 A1 6/2008

OTHER PUBLICATIONS

International Search report issued Dec. 27, 2010 for International Application No. PCT/IB2010/002406.

* cited by examiner

*Primary Examiner* — Hussein A. Elchanti

(57) ABSTRACT

At least one example embodiment discloses a method of detecting a bifurcation in a navigable feature. The method includes first determining a first possible segment and a second possible segment of the navigable feature based on location measurements along the navigable feature, the location measurements representing a heading vector and the location measurements having a higher probability of being on the first possible segment than on the second possible segment, second determining an angle based on the heading vector and a vector between the second possible segment and one of the location measurements, and detecting a bifurcation based on the angle.

19 Claims, 13 Drawing Sheets

SYSTEMS AND METHODS FOR DETECTING BIFURCATIONS

CROSS-REFERENCE TO RELATED APPLICATIONS

This application is the National Stage of International Application No. PCT/IB2010/002406, filed Sep. 6, 2010 and designating the United States. The entire contents of this application is incorporated herein by reference.

PRIORITY STATEMENT

This application claims the benefit of U.S. Provisional Application No. 61/240,253, filed Sep. 7, 2009, the entire contents of which are hereby incorporated by reference.

FIELD

This disclosure generally relates to systems and methods for bifurcation detection. At least some example embodiments relate to portable navigation devices (so-called PNDs).

BACKGROUND

In recent years, consumers have been provided with a variety of devices and systems to enable them to locate places on a digital map using GPS (Global Positioning System) signal reception, processing functionality and/or gyroscope values within the devices and systems. The variety of devices and systems used by consumers are in the form of in-vehicle navigation systems that enable drivers to navigate over streets and roads; hand-held devices such as personal digital assistants ("PDAs"), personal navigation devices (PNDs), and cell phones or other types of mobile devices that can do the same; desktop applications, and Internet applications in which users can generate maps showing desired places. The common aspect in all of these and other types of devices and systems is a map database of geographic features, vectors and attributes, and software to access, manipulate and navigate the map database in response to user inputs.

Generally, localization in bifurcations is difficult for positioning and map matching systems. Small errors in gyroscope measurements and/or tiny miscalibrations cause heading errors that are large enough to result in a wrong location and direction being displayed on a navigation device. In such a case, the position and heading errors are in the range of map incertitudes with a risk for a mismatch. Detecting a bifurcation in such circumstances can help the localization process.

SUMMARY

Example embodiments provide methods for bifurcation detection. Positioning systems such as gyroscope and GPS are used to display a position on a correct leg of the bifurcation.

At least one example embodiment discloses a method of detecting a bifurcation in a navigable feature. The method includes first determining a first possible segment and a second possible segment of the navigable feature based on location measurements along the navigable feature, the location measurements representing a heading vector and the location measurements having a higher probability of being on the first possible segment than on the second possible segment, second determining an angle based on the heading vector and a vector between the second possible segment and one of the location measurements, and detecting a bifurcation based on the angle.

At least another example embodiment provides for computer software including one or more software modules operable, when executed in an execution environment, to cause a computer to determine a first possible segment and a second possible segment of the navigable feature based on location measurements along the navigable feature, the location measurements representing a heading vector and the location measurements having a higher probability of being on the first possible segment than on the second possible segment, determine an angle based on the heading vector and a vector between the second segment and one of the location measurements, and detect a bifurcation based on the angle.

Another example embodiment is directed to a navigation device including a processor configured to determine a first possible segment and a second possible segment of the navigable feature based on location measurements along the navigable feature, the location measurements representing a heading vector and the location measurements having a higher probability of being on the first possible segment than on the second possible segment, determine an angle based on the heading vector and a vector between the second segment and one of the location measurements, and detect a bifurcation based on the angle.

BRIEF DESCRIPTION OF THE DRAWINGS

Various aspects of the teachings of the present disclosure, and arrangements embodying those teachings, will hereafter be described by way of illustrative example with reference to the accompanying drawings, in which.

Figure 1:
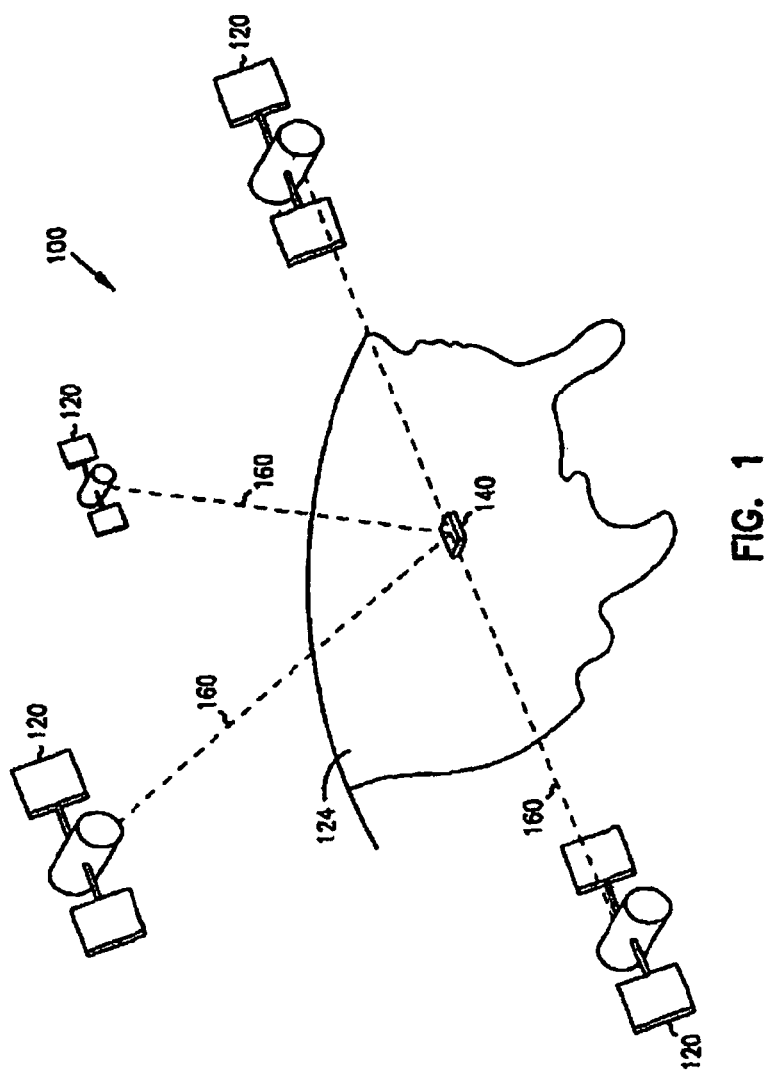
FIG. 1 is a schematic illustration of a Global Positioning System (GPS)

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It is convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, that perform particular tasks or implement particular abstract data types and may be implemented using existing hardware at existing network elements or control nodes (e.g., a database). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of computer readable medium or implemented over some type of transmission medium. The computer readable medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Example embodiments of the present disclosure will now be described with particular reference to a PND. It should be remembered, however, that the teachings of the present disclosure are not limited to PNDs but are instead universally applicable to any type of mobile device.

It follows therefore that in the context of the present application, a navigation device is intended to include (without limitation) any type of route planning and navigation device, irrespective of whether that device is embodied as a PND, mobile telephone or portable digital assistant (PDA) executing route planning and navigation software. The navigation device uses and/or measures its location.

It will also be apparent from the following that the teachings of the present disclosure even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
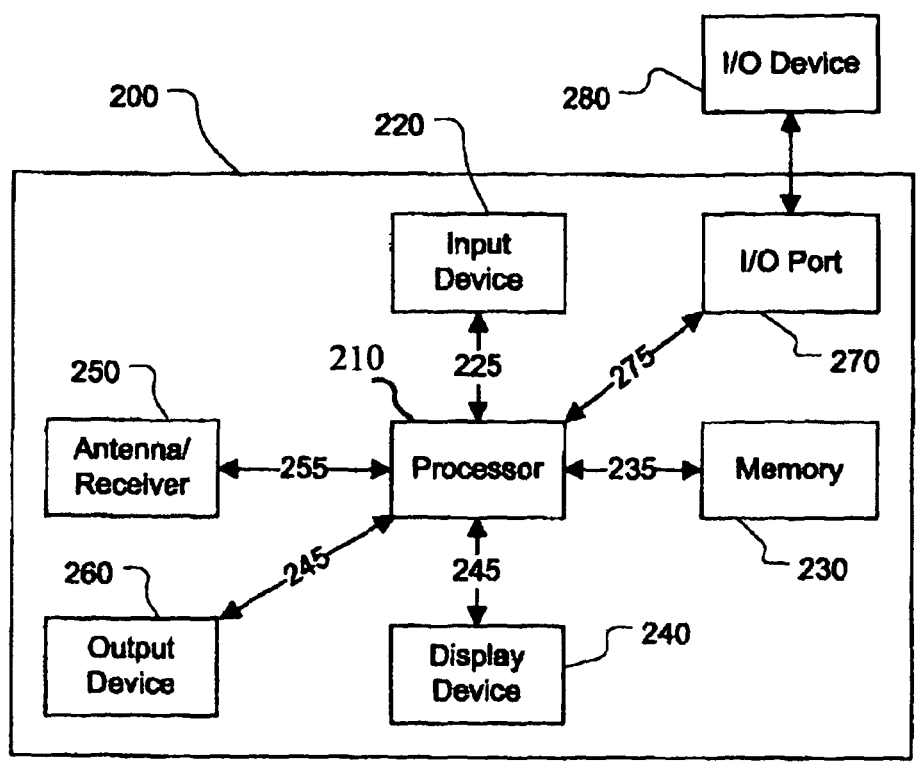
FIG. 2 is a schematic illustration of electronic components arranged to provide a navigation device.

FIG. 2 is an illustrative representation of electronic components of a navigation device 200 according to an example embodiment of the present disclosure, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In an example arrangement, the input device 220 and display screen 240 are integrated into an integrated input and display device, including a touchpad or touch screen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 220 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 includes, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
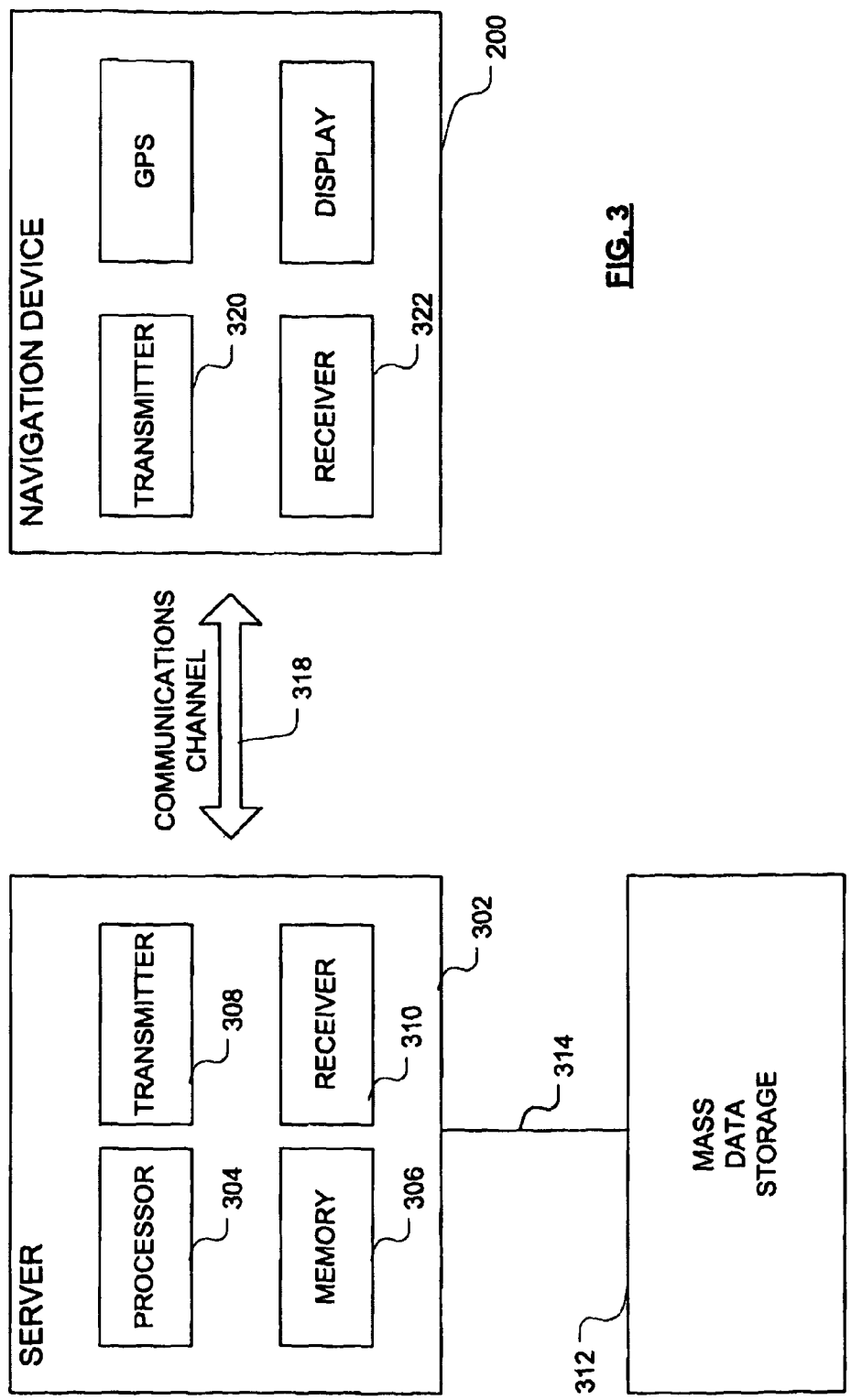
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 may be integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 260, such as audio input/output devices for example.

Figure 4A:
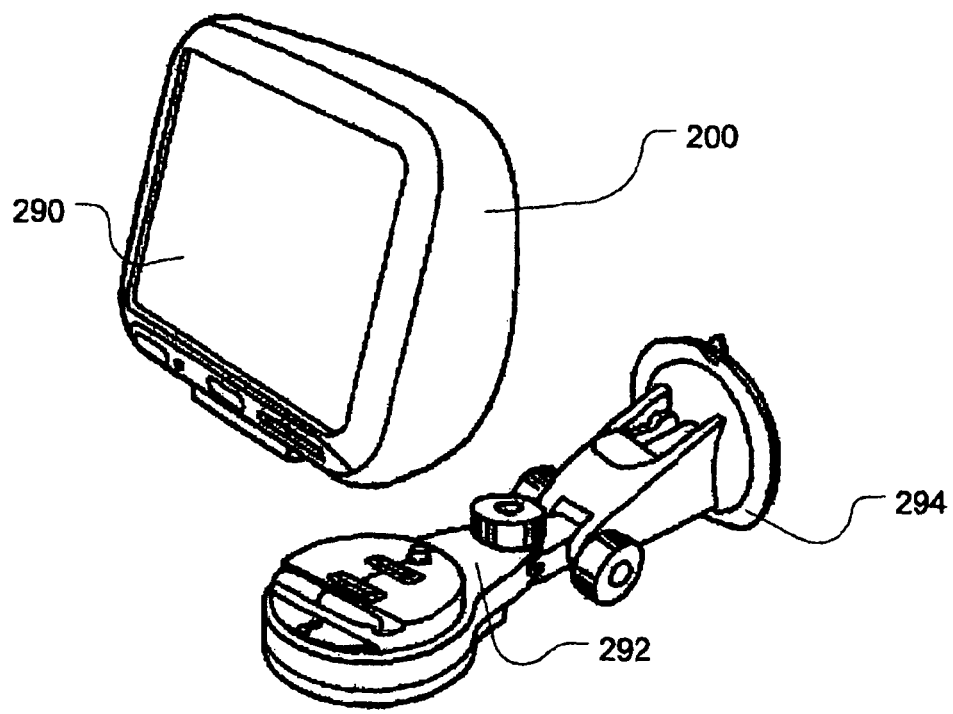
FIGS. 4a and 4b are illustrative perspective views of a navigation device.
Figure 4B:
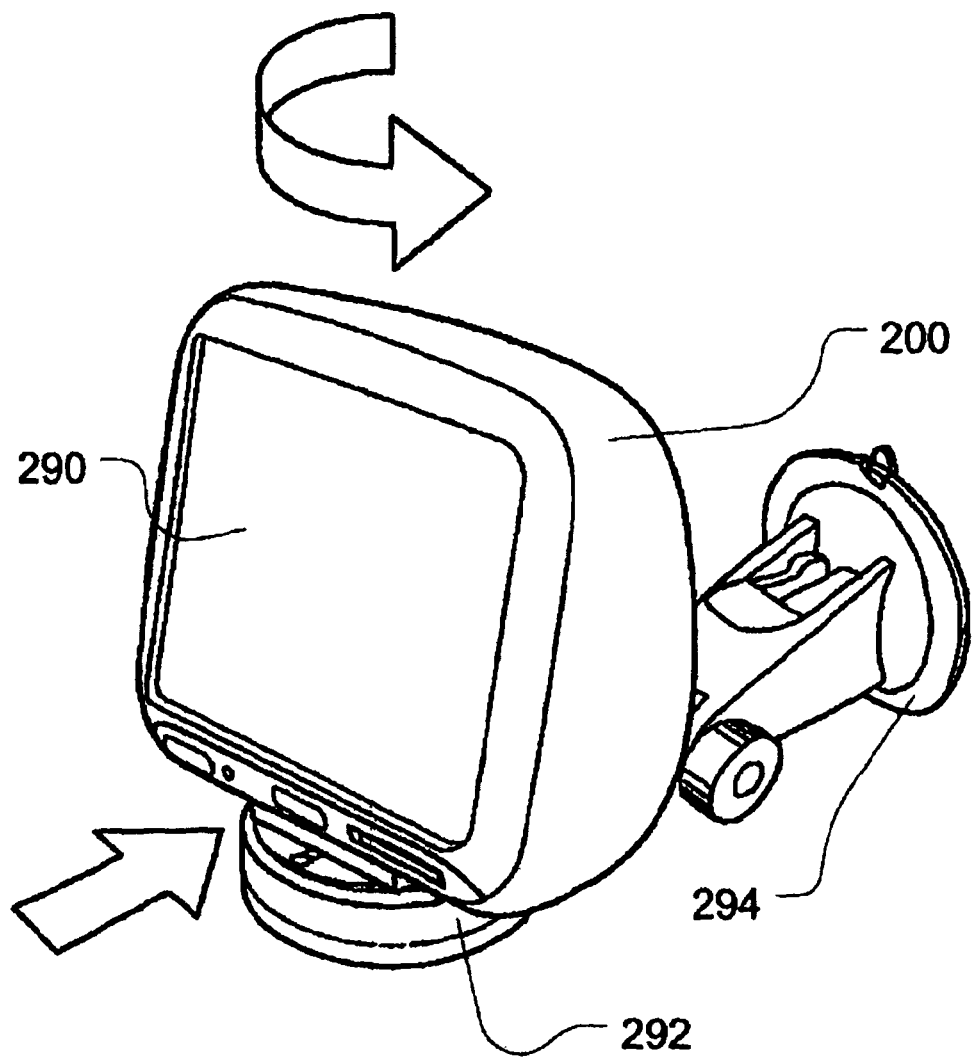

FIGS. 4a and 4b are perspective views of a navigation device 200. As shown in FIG. 4a, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4b, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4b. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Referring now to FIGS. 5a to 5i there is depicted a series of screenshots from a navigation device 200. This navigation device 200 has a touch screen interface for displaying information to a user and for accepting input to the device from the user. The screenshots show an illustrative example embodiment of a destination location input process for a user whose home location has been set to the offices in The Hague of the European Patent Office, and who wishes to navigate to a street address in Amsterdam, The Netherlands for which they know the street name and building number.

Figure 5A:
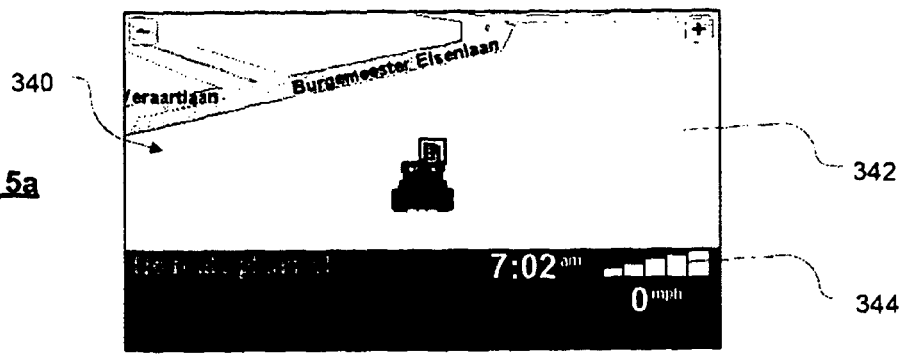
FIGS. 5a to 5i are illustrative screenshots from a navigation device for a destination input process.

When this user switches on their navigation device 200, the device acquires a GPS fix and calculates (in a known manner) the current location of the navigation device 200. The user is then presented, as shown in FIG. 5a, with a display 340 showing in pseudo three-dimensions the local environment 342 in which the navigation device 200 is determined to be located, and in a region 344 of the display 340 below the local environment a series of control and status messages.

Figure 5B:
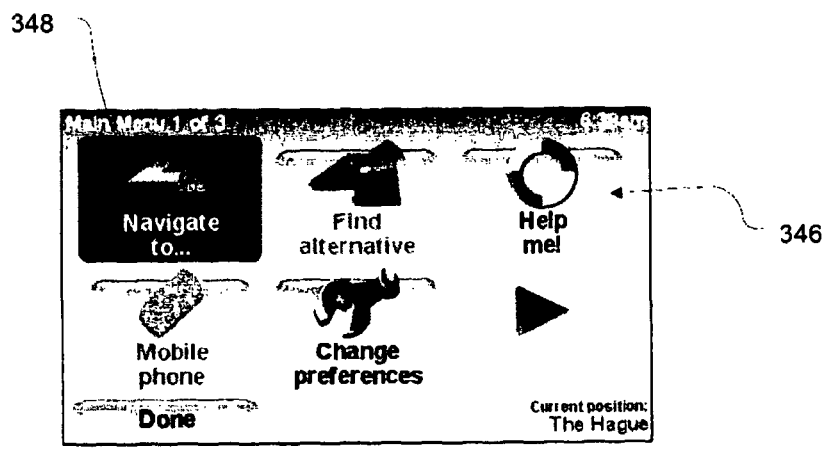

By touching the display of the local environment 342, the navigation device 200 switches to display (as shown in FIG. 5b) a series of virtual buttons 346 by means of which a user can, inter alia, input a destination that they wish to navigate to.

Figure 5C:
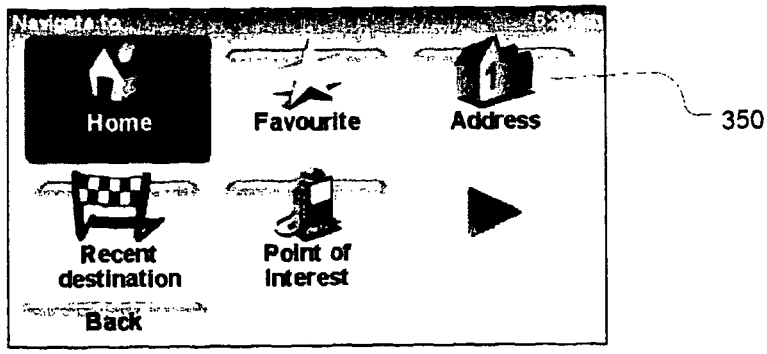

By touching the "navigate to" virtual button 348, the navigation device 200 switches to display (as shown in FIG. 5c) a plurality of virtual buttons that are each associated with a different category of selectable destinations. In this instance, the display shows a "home" button that if pressed would set the destination to the stored home location. However, in this instance as the user is already at their home location (namely the EPO's offices in the Hague) selecting this option would not cause a route to be generated. The "favourite" button, if pressed, reveals a list of destinations that the user has previously stored in the navigation device 200 and if one of these destinations is then selected the destination for the route to be calculated is set to the selected previously stored destination. The "recent destination" button, if pressed, reveals a list of selectable destinations held in the memory of the navigation device 200 and to which the user has recently navigated. Selection of one of the destinations populating this list would set the destination location for this route to the selected (previously visited) location. The "point of interest" button, if pressed, reveals a number of options by which a user can opt to navigate to any of a plurality of locations, such as cash machines, petrol stations or tourist attractions for example, that have been pre-stored in the device as locations that a user of the device might want to navigate to. The "arrow" shaped virtual button opens a new menu of additional options, and the "address" button 350 commences a process by which the user can input the street address of the destination that they wish to navigate to.

Figure 5D:
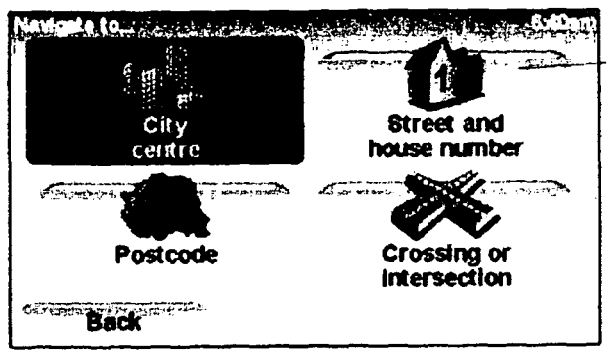

Since the user, in this example, knows the street address of the destination that they wish to navigate to, it is assumed that this "address" button is operated (by touching the button displayed on the touch screen), whereupon (as shown in FIG. 5d) the user is presented with a series of address input options—in particular for address input by "city centre", by "postcode", by "crossing or intersection" (for example a junction of two roads) and by "street and house number".

Figure 5E:

In this example the user knows the street address and house number of the destination and hence selects the "street and house number" virtual button 352 whereupon the user is then presented, as shown in FIG. 5e, a prompt 354 to enter the name of the city that they wish to navigate to, a flag button 356 by which the user can select the country in which the desired city is located, and a virtual keyboard 358 that may be operated by the user, if necessary, to input the name of the destination city. In this instance the user has previously navigated to locations in Rijswijk and Amsterdam, and the PND therefore additionally provides the user with a list 360 of selectable cites.

Figure 5F:
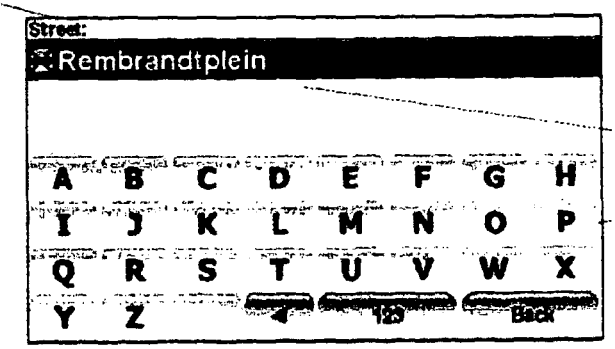

The user in this instance wishes to navigate to Amsterdam, and on selection of Amsterdam from the list 360 the navigation device 200 displays, as shown in FIG. 5f, a virtual keyboard 362 by means of which a user can input street names, a prompt 364 for entry of a street name 364 and, in this instance, as the user has previously navigated to a street in Amsterdam, a list 366 of selectable streets in Amsterdam.

In this example the user wishes to return to the street, Rembrandtplein, that they have previously visited and so selects Rembrandtplein from the displayed list 366.

Figure 5G:
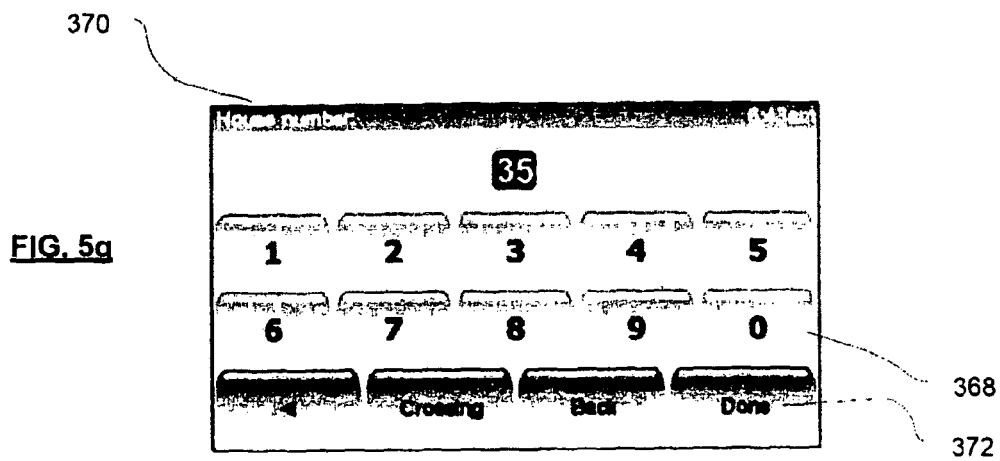

Once a street has been selected, the navigation device 200 then displays a smaller virtual keypad 368 and prompts the user, via prompt 370, to enter the number of the house in the selected street and city that they wish to navigate to. If the user has previously navigated to a house number in this street, then that number (as shown in FIG. 5g) is initially shown. If, as in this instance, the user wishes to navigate to No. 35, Rembrandtplein once again, then the user need only touch a "done" virtual button 372 displayed at the bottom right hand corner of the display. If the user should wish to navigate to a different house number in Rembrandtplein, then all they need do is operate the keypad 368 to input the appropriate house number.

Figure 5H:
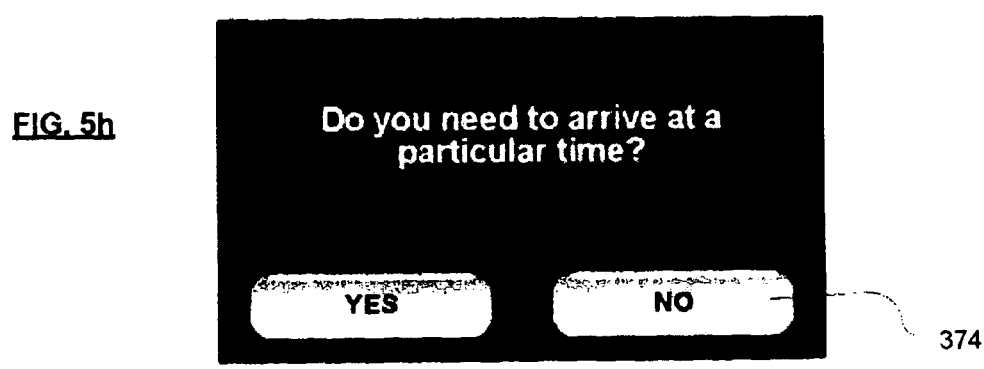

Once the house number has been input, the user is asked in FIG. 5h, whether they wish to arrive at a particular time. If the user should push the "yes" button, then functionality is invoked that estimates the time required to travel to the destination and advises the user when they should leave (or if they are running late, should have left) their current location in order to arrive at their destination on time. In this instance the user is not concerned about arriving at a particular time and hence selects the "no" virtual button.

Figure 5I:
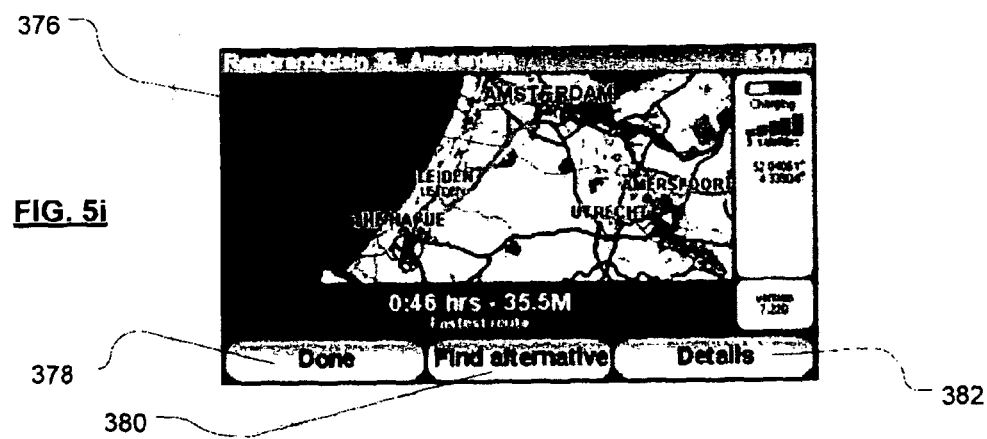

Selecting the "no" button 374 causes the navigation device 200 to calculate a route between the current location and the selected destination and to display that route 376, as shown in FIG. 5i, on a relatively low magnification map that shows the entire route. The user provided with a "done" virtual button 378 which they can press to indicate that they are happy with the calculated route, a "find alternative" button 380 that the user can press to cause the navigation device 200 to calculate another route to the selected destination, and a "details" button 382 that a user can press to reveal selectable options for the display of more detailed information concerning the currently displayed route 376.

Figure 6:
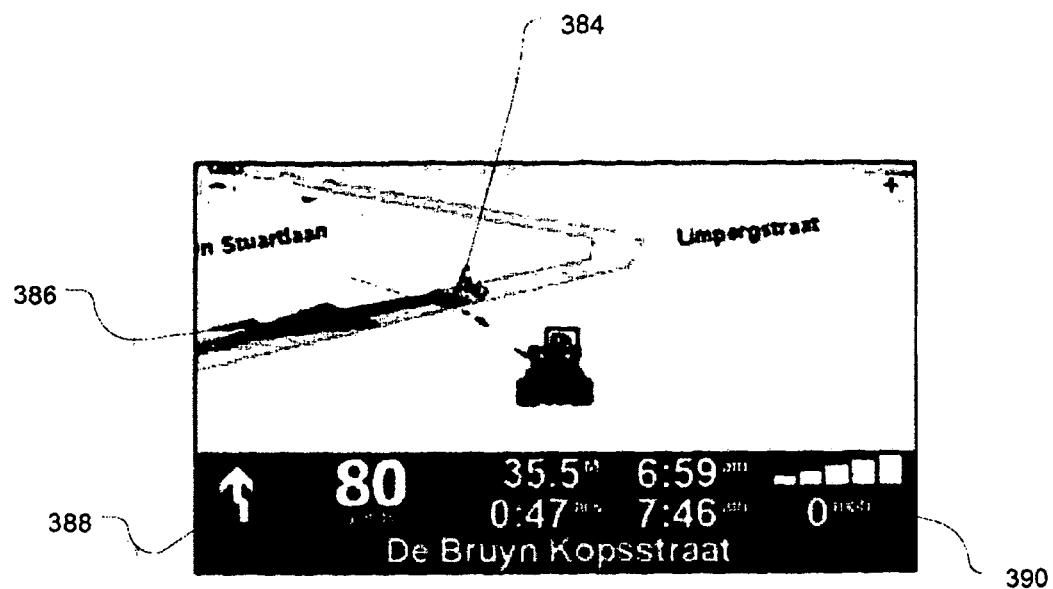
FIG. 6 is an illustrative screenshot from a navigation device depicting a start location for an illustrative calculated route.

In this instance it is assumed that the user is happy with the displayed route, and once the "done" button 378 has been pressed the user is presented, as shown in FIG. 6, with a pseudo three-dimensional view of the current, start, location for the navigation device 200. The display depicted in FIG. 6 is similar to that shown in FIG. 5a except that the displayed local environment 342 now includes a start location flag 384 and a waypoint indicator 386 indicating the next manoeuvre (in this instance, a left hand turn). The lower part of the display has also changed and now displays the name of the street in which the navigation device 200 is currently located, an icon 388 indicating the distance to and type of the next manoeuvre (from the current location of the navigation device 200), and a dynamic display 390 of the distance and time to the selected destination.

The user then commences their journey and the navigation device 200 guides the user, in a known manner, by updating the map in accordance with determined changes in navigation device 200 location, and by providing the user with visual and, optionally, audible navigation instructions.

In at least one example embodiment, a method of detecting a bifurcation in a navigable feature includes first determining a first possible segment and a second possible segment of the navigable feature based on location measurements along the navigable feature, the location measurements representing a heading vector and the location measurements having a higher probability of being on the first possible segment than on the second possible segment; second determining an angle based on the heading vector and a vector between the second possible segment and the heading vector; and detecting a bifurcation based on the angle. The example embodiments described below use GPS data as an example of sequential location measurements, however, the example embodiments should not be limited thereto.

Segments in navigation networks, such as a portion of a road and/or a sidewalk are often referred to as navigable features. Boundaries of these segments, such as centrelines, lanes, curbs, shoulder lines and stop sign lines may be referred to as geometric features.

Moreover, while example embodiments described below utilize GPS measurements (trace points) including latitudinal and longitudinal coordinates as location measurements, it should be understood that location measurements may be obtained from any source and are not limited to GPS.

Figure 7A:
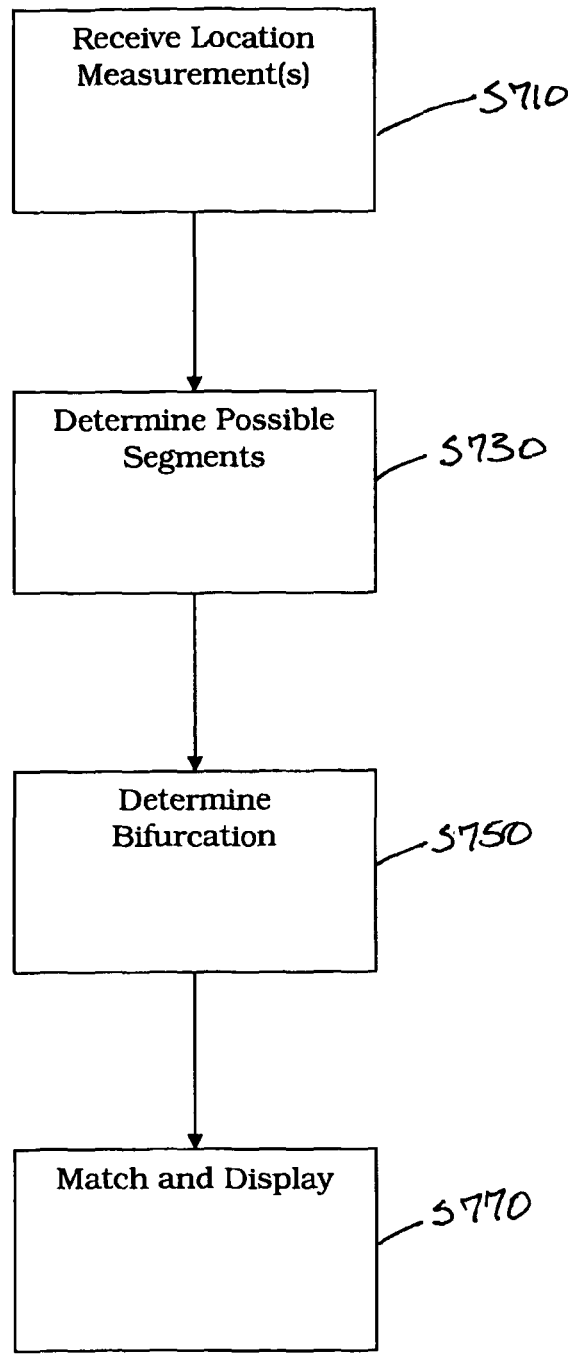
FIGS. 7a-7c illustrate a method of detecting a bifurcation in a navigable feature according to an example embodiment.
Figure 8:
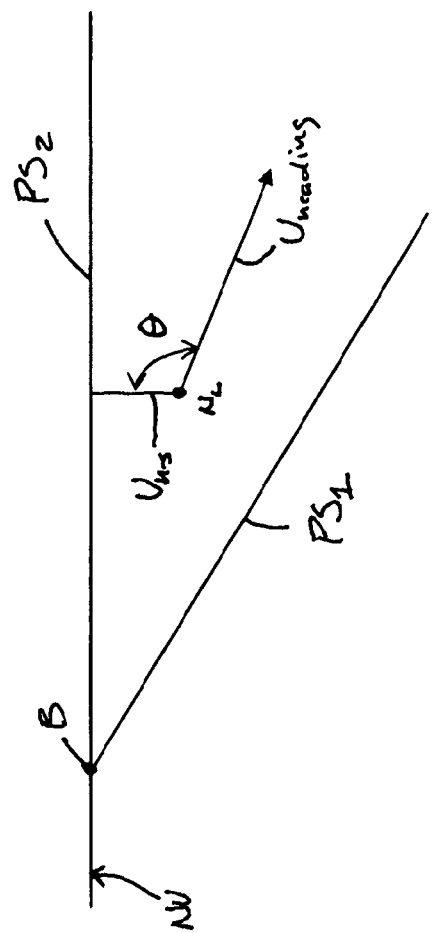
FIG. 8 illustrates an example embodiment of a method of detecting a bifurcation in a navigable feature according to the example embodiment of FIGS. 7a-7c.

FIGS. 7a and 8 illustrate a method of detecting a bifurcation in a navigable feature according to an example embodiment. The method of FIG. 7a may be performed by the navigation 200, for example. However, it should be understood that example embodiments are not limited thereto. For example, a server (e.g., server 302) may perform the method of FIG. 7a.

At S710, the navigation device receives at least one location measurement of the navigation device. The location measurements may be GPS, accelerometer, compass, wheel speed, radio and/or air pressure measurements, for example.

Based on the received location measurements, the navigation device determines a plurality of possible segments of navigable features where the navigation device is located at $S_{730}$. The possible segments may be determined by any known method of map matching. Using map matching, the navigation device orders the plurality of possible segments from a most likely possible segment (first possible segment) to a least likely possible segment. The navigation device determines a first possible segment and a second possible segment from the plurality of possible segments. The location measurements have a higher probability of being on the first possible segment than on the second possible segment.

Figure 7B:
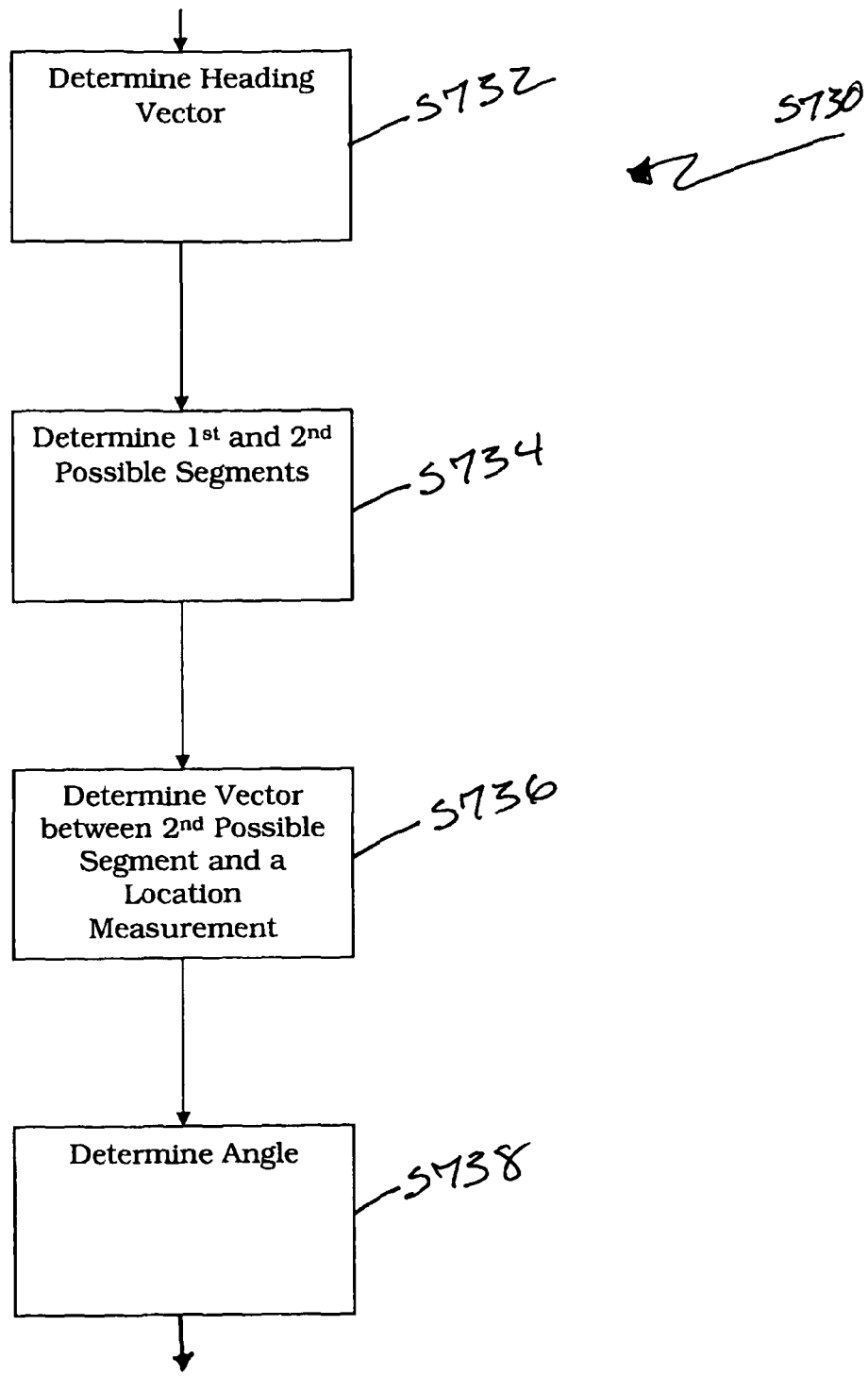

An example of step S730 is shown in greater detail in FIG. 7b. At $S_{732}$, the navigation device determines a heading vector based on sensor measurements (e.g., location measurements), previous values of the heading vector and/or map information. The heading vector points in a best estimated direction in which the navigation device is travelling. Also, the position of the navigation device is determined. The navigation device determines the first and second possible segments by matching the best estimated heading and best estimated location to digitized road representations on a digital map stored in the navigation device.

Based on the heading vector and the position, the navigation device determines the plurality of possible segments using any known map matching method at S734. The navigation device determines the plurality of possible segments based on at least one of position and orientation. Each of the plurality of possible segments has a rating. From the plurality of possible segments, the navigation device determines first and second possible segments based on the ratings. Each rating represents a likelihood of the navigation device being on the possible segment. Thus, the first possible segment has the highest rating and the second possible segment has the second highest rating.

The navigation device may initially assume that the first possible segment is the correct segment. Therefore, the navigation device may display a position corresponding to the first possible segment while the navigation device is performing the method of FIG. 7a.

At 5736, the navigation device determines a vector between the second possible segment and one of the location measurements as a navigation device based location. The navigation device based location may be the most recently received location measurement, for example.

The navigation device then determines an angle between the heading vector and a vector between the navigation device based location and the second possible segment at S738. The navigation device may determine the angle by first determining a dot product of the heading vector and the vector between the second possible segment and navigation device based location and then determining the cosine of the angle based on the dot product. The angle is then determined by the cosine value.

FIG. 8 provides an illustration of S730. As shown in FIG. 8, a bifurcation exists in a navigable feature NV. Based on location measurements, the navigation device determines a heading vector $V_{heading}$, a first possible segment $PS_1$ and a second possible segment $PS_2$. The navigation device then determines a vector $V_{h-s}$ from one location measurement (a navigation device based location $N_L$) to the second possible segment PS2. The navigation device then determines an angle θ.

Once the navigation device determines the angle at 5738, the navigation device determines whether a bifurcation exists in the navigable feature at S750, as shown in FIG. 7a.

Figure 7C:
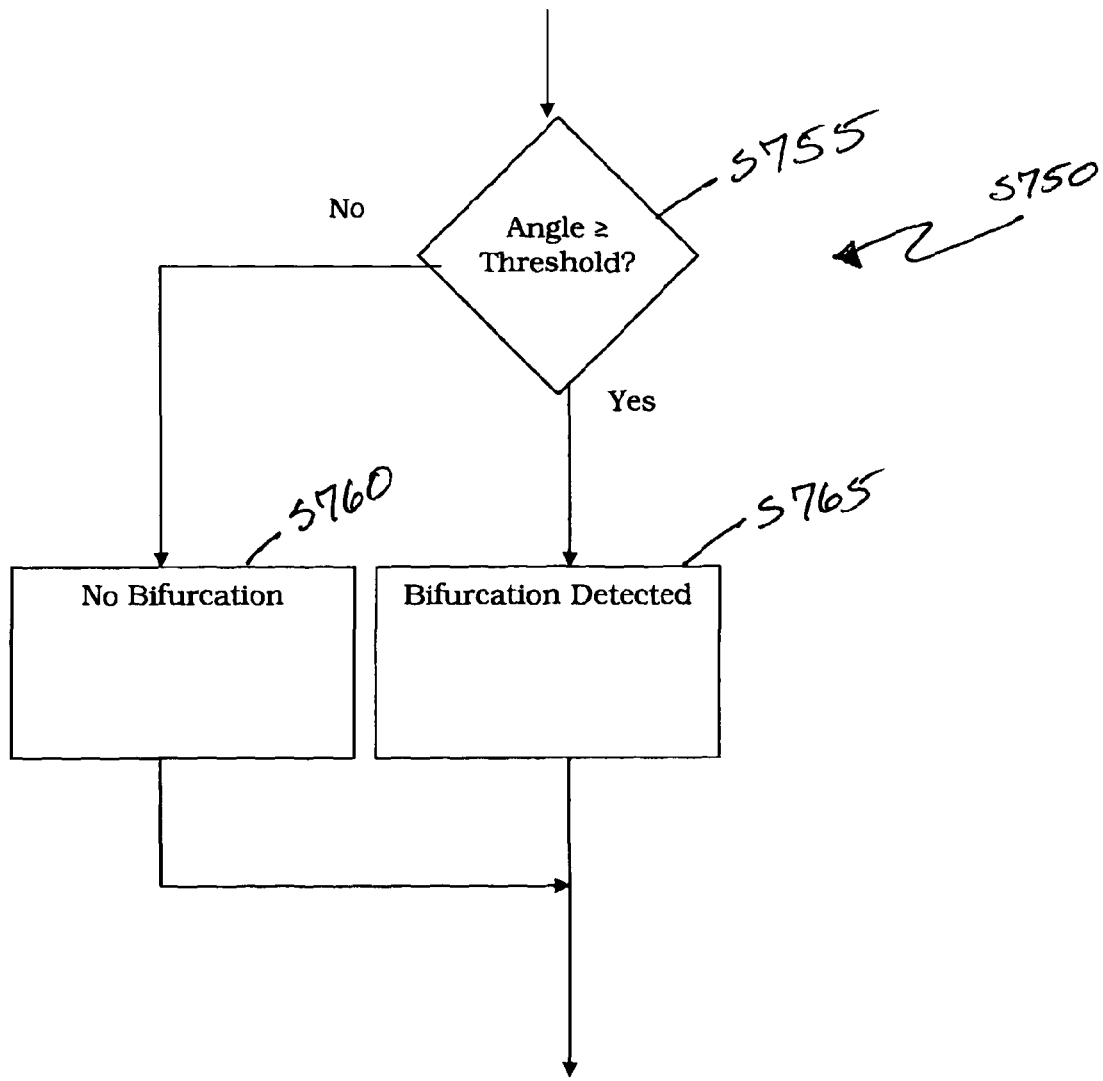

Step S750 is shown in greater detail in FIG. 7c. As shown, the navigation device determines whether the angle exceeds a threshold at S755. For example, the threshold may be seventy degrees. However, it should be understood that any threshold may be used. The threshold may be a constant or may change based on the environment of the route. While step S750 illustrates that the angle should be greater or equal to the threshold, S750 should not be limited thereto. It should be understood that values other than the angle may be used such as the cosine of the angle.

If the angle is not greater than or equal to the threshold, then the navigation device determines that there is no bifurcation at 5760. If the angle is greater than or equal to the threshold, then the navigation device determines that there is a bifurcation at S765.

Based on whether a bifurcation exists at S750, the navigation device matches a selected route to a map and displays the selected route on the map at S770. For example, the navigation device may display an arrow such as 384 (shown in FIG. 6) on the selected route. The position of the displayed selected route corresponds to a position on one of the first and second possible segments.

Selecting the first possible segment or the second possible segment as the selected route is based on detecting a bifurcation. The selected route is one of the first and second possible segments. If a bifurcation is not detected, a general route selecting algorithm may used. For example, the first possible segment may be selected if the angle is less than the threshold. However, if the bifurcation is detected, then a more complex route selecting algorithm may be used. For example, the first or second possible segment may be selected if the angle is greater than or equal to the threshold based on the route selecting algorithm. If a bifurcation is detected, the bifurcation may be marked on the map as a bifurcation and be incorporated into a map database.

It will also be appreciated that whilst various aspects and embodiments of the present disclosure have heretofore been described, the scope of the present disclosure is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device 200 may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the example embodiment implements certain functionality by means of software, that functionality could equally be implemented solely in hardware (for example by way of one or more ASICs (application specific integrated circuit)) or indeed by a mix of hardware and software. As such, the scope of the present disclosure should not be interpreted as being limited only to being implemented in software.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of detecting, by a navigation system, a bifurcation in a navigable feature, the method comprising:

first determining, by the navigation system, a first possible segment ($PS_1$) and a second possible segment ($PS_2$) of the navigable feature (NV), on which a navigation device is located, based on location measurements along the navigable feature (NV), the location measurements representing a heading vector ($V_{heading}$) pointing to an estimated direction in which the navigation device is travelling, and the location measurements having a higher probability of being on the first possible segment than on the second possible segment;

second determining, by the navigation system, an angle (θ) based on the heading vector ($V_{heading}$) and a vector ($V_{h-s}$) between the second possible segment ($PS_2$) and one of the location measurements; and detecting, by the navigation system, a bifurcation based on the angle (θ).

2. The method of claim 1, wherein the second determining includes,
  determining a navigation device based location ($N_L$) based on the location measurements, and
  determining the vector between the second possible segment and the heading vector, the vector ($V_{h-s}$) between the second possible segment ($PS_2$) and the one of the location measurements is a vector ($V_{h-s}$) from the navigation device based location ($N_L$) to the second possible segment ($PS_2$).

3. The method of claim 1, further comprising:
  selecting the first possible segment ($PS_1$) or the second possible segment ($PS_2$) as the segment of the location measurements based on the detecting.

4. The method of claim 3, further comprising:
  displaying a position on a navigation device, the position on the navigation device corresponding to the selected segment of the location measurements.

5. The method of claim 3, wherein the selecting includes a first selecting algorithm if the angle (θ) is less than 70 degrees.

6. The method of claim 3, wherein the selecting includes a second algorithm if the angle (θ) is greater than 70 degrees.

7. The method of claim 3, wherein the detecting detects a bifurcation if the angle (θ) is greater than a threshold.

8. The method of claim 1, wherein the second determining includes,
  determining a dot product of the heading vector ($V_{heading}$) and the vector ($V_{h-s}$) between the second possible segment ($PS_2$) and the one of the location measurements,
  determining a cosine of the angle (θ) based on the dot product.

9. The method of claim 1, wherein the first determining includes,
  matching the location measurements to at least one position on a map, and
  matching the location measurements to an orientation on the map, the position and orientation representing the heading vector ($V_{heading}$).

10. The method of claim 9, wherein the first determining includes,
  determining a plurality of possible segments based on the at least one position and the orientation, each of the plurality of possible segments having a rating, wherein the first possible segment ($PS_1$) has the highest rating and the second possible segment ($PS_2$) has the second highest rating.

11. The method claim 1, wherein the navigable feature (NV) includes at least one of a same road, a same path, a same highway and a same transportation segment.

12. The method of claim 1, wherein the location measurements are collected by a navigation device.

13. The method of claim 12, wherein the navigation device is any one of a map creation device, a personal navigation device, a mobile phone, a personal digital assistant and an in vehicle device.

14. The method of claim 1, wherein the first determining determines the first possible segment ($PS_1$) and the second possible segment ($PS_2$) of the navigable feature (NV) based on the location measurements along the navigable feature (NV) and map data.

15. A non-transitory computer readable medium including program segments for, when executed on a computer, causing the computer to implement the method claim 1.

16. Computer software comprising one or more software modules stored on non-transitory storage medium, said one or more software modules being operable, when executed in an execution environment, to cause a computer to:
  determine a first possible segment ($PS_1$) and a second possible segment ($PS_2$) of the navigable feature (NV), on which a navigation device is located, based on location measurements along the navigable feature (NV), the location measurements representing a heading vector ($V_{heading}$) pointing to an estimated direction in which the navigation device is travelling, and the location measurements having a higher probability of being on the first possible segment than on the second possible segment;
  determine an angle (θ) based on the heading vector ($V_{heading}$) and a vector ($V_{h-s}$) between the second possible segment ($PS_2$) and one of the location measurements; and
  detect a bifurcation based on the angle.

17. A navigation device comprising:
  a memory; and
  a processor coupled to the memory, wherein the processor is operative to,
  determine a first possible segment ($PS_1$) and a second possible segment ($PS_2$) of the navigable feature (NV), on which a navigation device is located, based on location measurements along the navigable feature (NV), the location measurements representing a heading vector ($V_{heading}$) pointing to an estimated direction in which the navigation device is travelling, and the location measurements having a higher probability of being on the first possible segment than on the second possible segment,
  determine an angle (θ) based on the heading vector ($V_{heading}$) and a vector ($V_{h-s}$) between the second possible segment ($PS_2$) and one of the location measurements, and
  detect a bifurcation based on the angle.

18. The navigation device of claim 17, wherein the navigation device is portable.

19. The navigation device of claim 17, wherein the navigation device is an in vehicle device.

* * * * *